Patented July 15, 1952

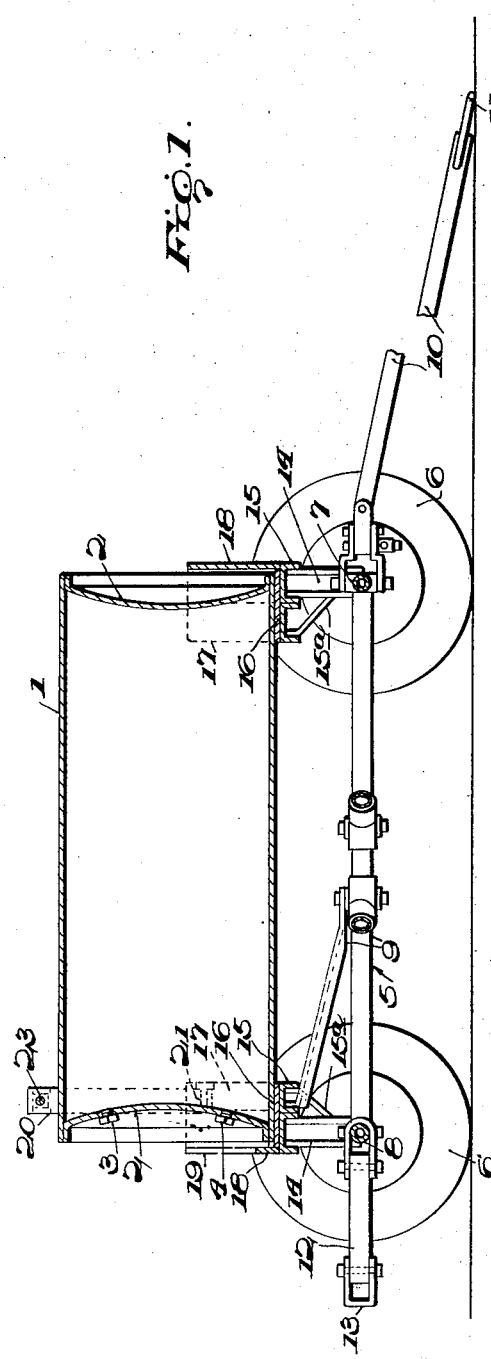

2,603,497

UNITED STATES PATENT OFFICE 2,603,497

TANK TRAILER FOR TRANSPORTING GASES

George M. Bramann and John L. Switzer, Niagara Falls, N. Y., assignors to Mathieson Chemical Corporation Application March 14, 1949, Serial No. 81,372

1 Claim. (Cl. 280—5)

The present invention relates to the transporting and use of chemical reagents of the type which are normally gaseous, but which are usually transported as a liquid, under pressure, in heavy steel containers, chlorine, sulfur dioxide, dichlorodifluoromethane, methyl chloride, hydrogen sulfide, dimethyl ether and ammonia, for instance.

The invention provides an improved method of transporting and using of such reagents and also an improved apparatus especially adapted to the transporting of such reagents and as a container for the reagent at the place where the reagent is to be used.

The invention is of particular utility as applied to the handling of chlorine and will be described herein with particular reference thereto. It will be understood, however, that the invention in its broader aspect is also applicable to other reagents.

Chlorine is usually transported as a liquid, under pressure, in large steel cylinders holding about a ton of the liquid chlorine. These cylinders are of necessity of heavy construction to withstand the pressure of the liquid and even when empty are of very considerable weight. Consequently, heavy cranes, or derricks, are usually required for their handling. Frequently, it is desired to use the chlorine at substantial distances from available handling facilities necessitating the installation of expensive additional hoisting and handling equipment, as well as special racks for supporting the cylinders at the place of use. Likewise, there may be several locations in a single plant where chlorine is periodically used, necessitating either a number of separate cylinders of chlorine or else special handling equipment, or specially constructed conduits for conveying the chlorine from the cylinder to the locations where it is to be used. Because of the peculiar characteristics of chlorine, such conduits are expensive to install and maintain and leaks, or other failure of such conduits might have disastrous results.

These difficulties heretofore experienced in the handling and use of chlorine are avoided by the present invention by providing novel apparatus adapted to the ready transporting of liquid chlorine, or similar normally gaseous reagents, under pressure, whereby the troublesome handling of heavy cylinders at the place of use is avoided and whereby the bulk of the reagents may, with relative ease, be moved from place to place, to the plant and within the plant in which it is to be used without the use of derricks, or other special handling equipment.

The apparatus comprises in combination a container, suitably of the type conventionally used for transporting liquid chlorine, mounted horizontally on a suitable carriage adapted to be wheeled about at will, either singly or in trains.

The invention will be more fully described and illustrated with reference to the accompanying drawings of which Figure I represents conventionally and somewhat diagrammatically, a side sectional view of the carriage assembly, and Figure II similarly represents a rear view of the assembly.

In the drawings, a conventional chlorine cylinder, fabricated of suitable metal and having a capacity of one ton of liquid chlorine is identified by the reference numeral 1. This cylinder is closed at the ends by outwardly concave metal end walls 2. In one of the end walls there are provided two outlets sealed by a plug, or valve arrangement represented at 3 and 4 for use in filling the cylinder and withdrawing chlorine therefrom, as well understood by the art.

The cylinder 1 is mounted on a suitable carriage 5 of the trailer type, equipped with four wheels 6, advantageously of the type provided with pneumatic tires. Carriages having a different number of wheels may be employed, but one having four wheels is particularly advantageous since it provides desirable stability and is economical to construct.

In accordance with an important aspect of the invention, the chassis of the carriage, as indicated in the drawing, is of a conventional trailer type. If desired, however, it may be equipped with automotive power and a conventional steering mechanism.

The chassis of the carriage shown in the drawings comprises front and rear axles 7 and 8 braced and connected by rods, channel irons, or the like, 9 in a conventional manner. In the drawings, details of the mechanism for steering the carriage are not shown. Any suitable arrangement, such as conventionally used in trailers, may be provided for pulling or pushing and for guiding the carriage. Details of the chassis framework and steering mechanism constitute no part of the present invention and a detailed showing in the drawings does not appear to be necessary.

Fastened to the front end of the chassis is a tongue 10 with coupling 11 for fastening the carriage to a truck, or other motive power means, or to a train of similar carriages. For the latter purpose, a tongue 12 and coupling 13 may also be provided at the rear end of the chassis.

Mounted at each end of the chassis frame is an angle iron support 14 surmounting the front and rear axles. To each of these supports 14 there is fastened as by welding a further support, indicated at 15 and 15a. A cradle member 16 is fastened, preferably by welding, to each of the supports 15 and the cradles are further supported at their sides by welded angle irons 17. Each cradle is also provided with an end plate 18 for preventing endwise movement of the cylinder. The end plate at that end, corresponding to the outlet end of the cylinder, is partially cut-out, as shown at 19, to provide ready access to the outlet 4.

An adjustable strap 20 is shown hinged to the angle irons 17 of the rear cradle at 21 adapted to pass over the top of the cylinder and securely to hold the cylinder against turning within the cradle while in transit. In this way, alignment of valve 4 and opening 19 in the rear plate 18 is assured. Any conventional method may be used for tightening the strap around the cylinder. A particularly advantageous arrangement is shown in the drawing whereby the strap is tightened by turning the female threaded member 22 onto the hinged male threaded member 23 as by means of handle 24. With this arrangement, the right-hand half of the strap will be provided with a notch at the upper end through which element 23 passes so that when element 22 has been loosened, the entire tightening mechanism can be swung over onto the left-hand half of the strap, thus facilitating the replacement of the cylinder.

In the particular apparatus illustrated in the drawing, no provision, other than pneumatic tires, is made for easing the riding properties of the carriage. It will be understood, however, that any conventional spring suspension arrangement may be employed without departing from the spirit of the present invention.

The cylinder may be permanently secured to the cradles but, in most instances, it is desirable that the cylinder be readily removable and that end is especially advantageously attained by the construction shown, which permits the ready removal and replacement of the cylinder as by means of a derrick, or other hoisting equipment and which provides adequate support for the cylinder during transportation and use.

If desired, the cylinder may be charged with liquid chlorine without removal from the carriage by passing liquid chlorine into the cylinder through the inlet 4, the inlet 3 being open during charging to permit escape of gases from the cylinder. However, a particularly advantageous feature of the invention is that the cylinder is readily interchangeable with and replaceable by other cylinders of the same type so that, at the primary source of the chlorine, an empty drum may by derrick, or otherwise, be elevated from the carriage and replaced by a fresh drum of chlorine.

The cylinder being charged with liquid chlorine, the feed lines disconnected and the full cylinder of chlorine in place in the cradles, the carriage is now readily wheeled to the place where the chlorine is to be used. At the point of delivery, the cylinder is left in place on the carriage while the chlorine is being used. No handling equipment or racks are required. In use, the chlorine carriage may readily be wheeled from place to place, to various locations where the chlorine is to be used, connections with the cylinder being readily made through the valved outlets provided in the end walls of the cylinder.

The invention is of utility wherever chlorine is transported and used in bulk, as in bleaching and any of the many known chlorinating operations depending upon cylinders of liquid chlorine for the chlorine supplied. After use, the empty cylinder is disconnected, wheeled out of position, and a fresh cylinder of chlorine wheeled into place and connected. The empty cylinder is then returned to the primary source of the chlorine where the cylinder is refilled, or replaced by a fresh cylinder of chlorine.

We claim:

A mobile carriage for transporting a self-sustaining cylindrical tank containing normally gaseous reagents in liquid form under pressure comprising a chassis frame including a pair of axles, and a rod rigidly interconnecting said axles; and tank cradle means rigidly mounted on said chassis frame having a front tank supporting means and similar rear tank supporting means, each of said tank supporting means consisting of a pair of angle iron supports rigidly connected at their lower portions to their respective ends of one of said axles and extending upwardly and longitudinally inwardly thereof, horizontal support means rigidly secured to the upper portions of said angle iron supports and extending longitudinally of said one of said axles, vertical support means including a pair of spaced vertical members rigidly connected at their lower portions to said horizontal support means, an arcuate cradle member having two upper portions rigidly secured to their respective upper portion of said vertical members and a bottom portion mounted on said horizontal support means, said arcuate cradle member forming a curved supporting surface for receiving and engaging in surface to surface contact a curved portion of said cylindrical tank, and a vertically extending end plate rigidly connected to the outer peripheral edge of said arcuate cradle member for preventing endwise movement of said cylindrical tank.

GEORGE M. BRAMANN.
JOHN L. SWITZER.

REFERENCES CITED

The following references are of record in the file of this patent:

UNITED STATES PATENTS

| Number | Name | Date |
|---|---|---|
| 1,175,312 | Simpson | Mar. 14, 1916 |
| 1,897,161 | Endacott | Feb. 14, 1933 |
| 2,358,537 | Rose | Sept. 19, 1944 |
| 2,421,765 | Taylor | June 10, 1947 |

FOREIGN PATENTS

| Number | Country | Date |
|---|---|---|
| 307,773 | Germany | Oct. 4, 1919 |
| 412,471 | Germany | Apr. 22, 1925 |
| 737,423 | France | Oct. 3, 1932 |